July 31, 1923.
L. D. SOUBIER
DRAWING CONTINUOUS SHEET GLASS
Filed May 28, 1921
1,463,273
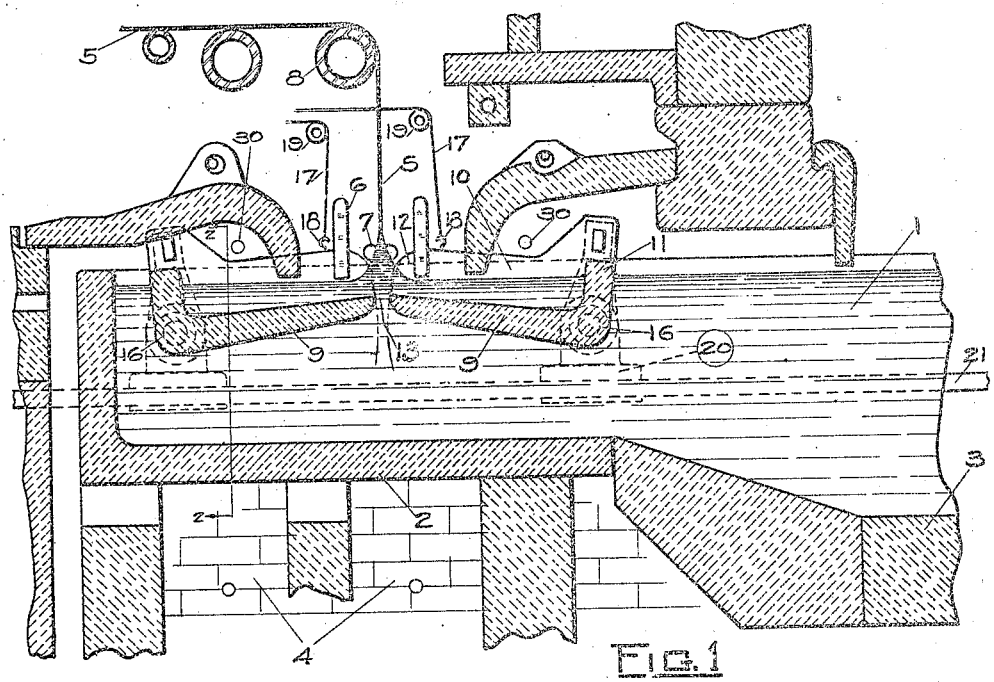
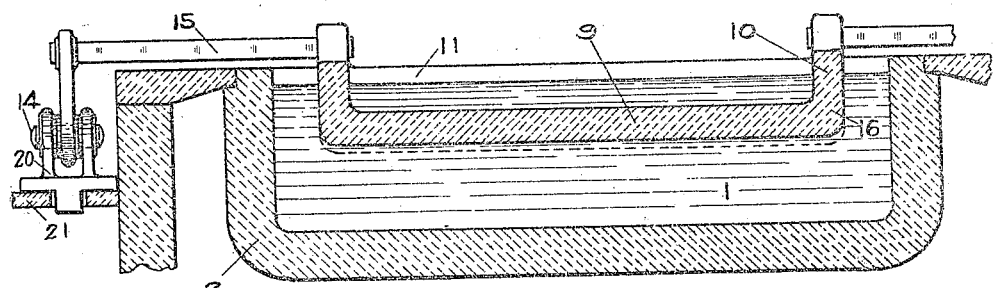
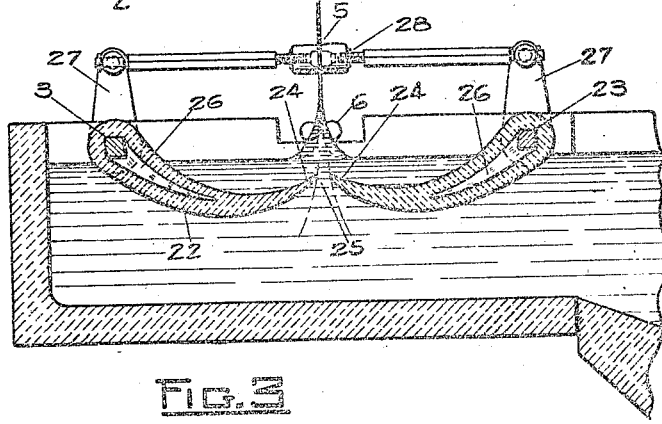
INVENTOR
Leonard D. Soubier
BY C.H. Powley
ATTORNEY Patented July 31, 1923.

1,463,273

UNITED STATES PATENT OFFICE.

LEONARD D. SOUBIER, OF TOLEDO, OHIO, ASSIGNOR, BY MESNE ASSIGNMENTS, TO THE LIBBEY-OWENS SHEET GLASS COMPANY, OF TOLEDO, OHIO, A CORPORATION OF OHIO.

DRAWING CONTINUOUS SHEET GLASS.

Application filed May 28, 1921. Serial No. 473,535.

*To all whom it may concern:*

Be it known that I, LEONARD D. SOUBIER, a citizen of the United States, residing at Toledo, in the county of Lucas and State of Ohio, have invented new and useful Improvements in Drawing Continuous Sheet Glass, of which the following is a specification.

This invention relates to a new and improved method and apparatus of drawing sheet glass continuously from a bath of molten glass. In previously known forms of apparatus for drawing sheet glass, it has been customary to either draw the sheet from a shallow pot or receptacle, into which the glass is fed at one side from a continuous tank furnace, or to draw the glass directly from the rather deep body of glass at one end of the supply tank. The present apparatus combines some of the better features of both of these forms of apparatus, the sheet being drawn from a shallow segregated mass of molten glass, lying directly within the larger molten mass from which the supply is obtained.

More specifically a pair of opposing pivoted partition members, forming substantially the two halves of a shallow pot or receptacle, are mounted within the molten glass adjacent the upper surface thereof. These members may be tilted or swung about their pivots and also moved bodily toward or from one another by means accessible from outside the apparatus, and in this way the effective depth of the draw-pot is adjusted. The supply of glass to the interior of this shallow pot, flows up through the slot or passage between the opposing pivoted members, directly beneath the line of draw of the sheet, thus insuring an even and equal feed to the sheet from both sides thereof. At the same time the width or area of the slot or passage may be varied by adjusting the members about their pivots, or moving them toward or from one another.

The specific objects and advantages of the invention will be more clearly understood from the following detailed description of certain forms of apparatus adapted to carry out the invention.

In the accompanying drawings:

Fig. 1 is a vertical longitudinal section through one form of the apparatus.

Fig. 2 is a vertical cross section through this apparatus taken substantially on the line 2—2 of Fig. 1.

Fig. 3 is a partial longitudinal section, similar to Fig. 1, of a modified form of the apparatus.

The molten glass 1, flows into receptacle 2, from any suitable source of supply such as a continuous tank furnace. The receptacle 2 may be made of any convenient or desirable depth, and is, in fact, substantially a continuation of the tank or refining chamber 3. Receptacle 2 is surrounded by suitable heating chambers 4, to keep the molten glass therein at the proper temperature.

The glass sheet 5 is drawn upwardly from the molten bath of glass in any approved manner. The system indicated in the drawings is of the well-known Colburn type, wherein the sheet is drawn up between coolers 6, and edge-forming rolls 7, bent over a cooled bending roll 8, and carried off horizontally through suitable drawing mechanism and into a leer. This system is merely illustrative, as any other similar form of sheet drawing mechanism might be used with the apparatus about to be described.

Suspended within the molten glass, near the upper surface thereof, is a pair of substantially horizontal partition members 9, of refractory material, each comprising a base portion 9, side walls 10 and rear wall 11, thus forming a shallow receptacle with one open end 12. The open ends of the two members are opposed, so that the members when in operative position, form together a substantially enclosed shallow receptacle, with a slot or passage 13 through the bottom thereof at its center.

Each of the members is mounted to swing about alined pivots 14, (only one being shown in Fig. 2 of the drawings, but it is to be understood that a similar pivot is located at the other side of the pot). The members 9 are supported from the pivots by bracket extensions 15, which swing clear of the upper edges of the pot 2. In this way the members swing about axes passing through their lower outer corners or elbows 16. As one means of swinging the members about their pivots, cables 17, attached to hooks 18 near the adjacent ends of the members are illustrated in Fig. 1. These cables may be led off over direction pulleys 19 to any easily accessible point, and suitable means will be provided to hold the cables independently at any desired adjustments. By swinging the members 9 downwardly from the position shown in Fig. 1, the effective depth of the molten glass in the draw receptacle formed by these members is increased. At the same time the width of the passage or slot 13, through which the molten glass flows up into the draw pot is decreased. Pivots 14 are carried by brackets 20, slidable along slotted supporting rails 21. By adjusting the positions of brackets 20, the two halves of the container may be moved bodily toward or from one another, thus varying the width of passage 13 at any elevation of the members 9. The glass in the upper shallow container is maintained at the proper temperature by the heated gases passing through from the tank, and around the end of pot 2 from heating chambers 4. Burners 30 may also be used above the glass in the container.

In the modified form indicated in Fig. 3, the members 22 are of a substantially arcuate form, being pivoted at their outer ends 23, above the glass level, and their inner ends 24 forming the passage 25 for regulating the upward flow of the molten glass. At 26 are indicated metal spiders or frames within the refractory members to support same from the pivots 23. At the sides of the draw pot, lever arms 27, keyed to the pivot shafts 23, are connected by turnbuckle mechanism 28, whereby the adjustment of the pivoted members is accomplished. In this form of the apparatus, the end partitions 10, as shown in Fig. 1, have been omitted, so that the glass may flow into the shallow draw-pot at the ends thereof, as well as through the slot 23. In this form of the apparatus, as the members 22 are swung downwardly to increase the depth of glass in the upper container, the width of passage 25 is simultaneously increased.

As is well-known in this art, the sides of the receptacle or container have a chilling effect on the molten glass adjacent thereto, and chilling bars are sometimes used beneath the line of draw of the sheet to give a localized cooling effect to the molten glass at this point. The adjacent inner ends of the members 9 or 22, in the present apparatus, exert a similar cooling effect on the glass, and by adjusting these refractory members up or down, and thus bringing their inner ends closer to or further from the line of draw of the sheet, a variable and easily controlled cooling effect at this point may be obtained. Also by moving these members toward or from one another, the width of passage 13 or 25 may be varied to restrict or increase the flow of hot glass to the drawing point. By varying these adjustments as found desirable the temperature conditions at the drawing point, and hence the viscosity of the molten glass which is being drawn into the sheet may be easily controlled. Also, since the supply of hot molten glass is fed to the sheet from directly below the drawing point, the temperature conditions, and rate of flow from both sides of the sheet will be equalized.

Claims:

1. In a sheet glass drawing apparatus, a tank containing molten glass, means for drawing a sheet of glass therefrom, a container within the molten glass for segregating that portion of the glass from which the sheet is drawn, said container having a passage in its bottom in approximately the vertical plane in which the sheet is drawn, through which the glass flows in from the tank, and means for adjusting the width of the passage.

2. In a sheet glass drawing apparatus, a tank containing molten glass, means for drawing a sheet of glass therefrom, a container within the molten glass for segregating that portion of the glass from which the sheet is drawn, the container being divided, substantially in the plane of the glass sheet, into two similar sections, and means for bodily moving the sections toward and from one another to vary the width of the passage therebetween.

3. In a sheet glass drawing apparatus, a tank containing molten glass, means for drawing a sheet of glass therefrom, a container within the molten glass for segregating that portion of the glass from which the sheet is drawn, the container being divided, substantially in the plane of the glass sheet, into two similar sections, the sections being pivoted adjacent their outer edges to swing about axes substantially parallel with the line of generation of the sheet.

4. In a sheet glass drawing apparatus, a tank containing molten glass, means for drawing a sheet of glass therefrom, a container within the molten glass for segregating that portion of the glass from which the sheet is drawn, the container being divided, substantially in the plane of the glass sheet, into two similar sections, the sections being pivoted to swing toward and from one another and vary the width of the passage therebetween.

5. In a sheet glass drawing apparatus, a tank containing molten glass, means for drawing a sheet of glass therefrom, a container within the molten glass for segregating that portion of the glass from which the sheet is drawn, the container being divided, substantially in the plane of the glass sheet, into two similar sections, the sections being pivoted to swing toward or from the surface of the molten glass, and thus vary the effective depth of the container.

6. In a sheet glass drawing apparatus, a tank containing molten glass, means for drawing a sheet of glass therefrom, and a container within the molten glass for segregating that portion of the molten glass from which the sheet is drawn, the container comprising two independent pivoted sections.

7. In a sheet glass drawing apparatus, a tank containing molten glass, means for drawing a sheet of glass therefrom, and a pair of movable partitions within the molten glass for directing the flow of glass upwardly to the draw-point in the plane of the glass sheet.

8. In a sheet glass drawing apparatus, a tank containing molten glass, means for drawing a sheet of glass therefrom, and a pair of movable partitions within the molten glass, adjustable toward and from one another, for directing the flow of glass upwardly to the draw-point in the plane of the sheet.

9. In a sheet glass drawing apparatus, a tank containing molten glass, means for drawing a sheet of glass therefrom, and a pair of pivoted partitions within the molten glass, for directing the flow of glass upwardly to the draw-point in the plane of the sheet.

10. In a sheet glass drawing apparatus, a tank containing molten glass, means for drawing a sheet of glass therefrom, and a pair of movable chilling bars independently adjustable within the molten glass beneath the line of draw of the sheet.

11. In a sheet glass drawing apparatus, a tank containing molten glass, means for drawing a sheet of glass therefrom, a container within the molten glass to segregate that portion of the molten glass from which the sheet is drawn, said container having an adjustable inlet passage to direct the flow of glass in the direction of the draw and to regulate said flow relative to the draw.

Signed at Toledo, in the county of Lucas and State of Ohio, this 24th day of May, 1921.

LEONARD D. SOUBIER.